United States Patent
Schenkel et al.

(10) Patent No.: US 7,515,016 B2
(45) Date of Patent: Apr. 7, 2009

(54) RECONFIGURING IMPEDANCE MATCHING FOR HIGH POWER CIRCUITS

(75) Inventors: Horst Schenkel, Eckental (DE); Bernd Friedel, Markt Bibart (DE)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 322 days.

(21) Appl. No.: 11/372,240

(22) Filed: Mar. 9, 2006

(65) Prior Publication Data
US 2007/0210873 A1 Sep. 13, 2007

(51) Int. Cl.
*H03H 7/38* (2006.01)
(52) U.S. Cl. .................................. 333/32; 333/17.3
(58) Field of Classification Search ............ 333/33, 333/34, 35, 17.3
See application file for complete search history.

(56) References Cited

U.S. PATENT DOCUMENTS 4,023,125 A * 5/1977 Wolfe ..................... 333/238

6,317,608 B1 11/2001 Glöcker ..................... 455/553

OTHER PUBLICATIONS

European Search Report for EP06251259.5 dated Sep. 1, 2006.

* cited by examiner

*Primary Examiner*—Stephen E Jones

(57) ABSTRACT

A method and an apparatus are provided for impedance matching using an analog circuit. The method comprises providing the analog circuit to substantially match a start impedance to an end impedance and tuning a performance parameter of an associated circuit using the analog circuit operating at a high power level. The analog circuit may transform the start impedance to the end impedance using a characteristic impedance in a range above the start impedance and the end impedance. By reconfiguring the analog circuit, the associated circuit may operate at one of a first, second, or higher order frequency bands. By using a matching transformation process, reconfigurable matching circuits for medium and/or high power applications may be provided by using available lower power reconfiguration elements. In the matching transformation process, the intermediate impedance at which the reconfiguration is performed is higher than the matching processes used for lower power reconfiguration elements. A relatively smaller and cheaper reconfiguration element having lower parasitics may be used.

6 Claims, 4 Drawing Sheets

RECONFIGURING IMPEDANCE MATCHING FOR HIGH POWER CIRCUITS

BACKGROUND OF THE INVENTION

1. Field of the Invention

This invention relates generally to telecommunications, and more particularly, to wireless communications.

2. Description of the Related Art

Communications systems typically comprise software and hardware, including a variety of analog and digital electronic circuits. To improve performance of communication systems, old circuit designs are routinely replaced with new designs that meet specifications for more advanced products. However, one constant goal is to reduce costs of the circuits to be competitive in the market. Therefore, the product circuit designers are generally searching for creative ways to reduce the cost of the electronic circuitry and systems. One means to reduce the costs is to use only one type of analog hardware. For example, in reconfigurable or tunable circuits, one type of reconfigurable matching circuits has been routinely used to serve different frequency bands. A reconfigurable matching circuit may optimize the performance of an analog circuit to the instantaneous operating frequency band. This "one hardware" approach leads inherently to a reduction in cost for the hardware due to higher volume, less design risk and design time and less liability.

To implement reconfigurable matching circuits, continuous variable components like varactors, variometers and potentiometers and/or switching components like relays, switches and PIN-diodes are usually deployed. One problem with continuous variable components or elements is that they have relatively low maximum ratings for power and current, which generally limits their use to low-power stages. As a result, reconfigurable elements for higher power and current are not readily available. One type a reconfigurable element that may be used with higher power and current is bulky, expensive and cannot be integrated into an analog circuit because they lack a form and fit equivalent to other surrounding circuits.

A matching process generally involves a start impedance, for example, the low output impedance of a RF power amplifier, which is to be transformed to an end impedance, for example, a commonly used 50 Ohm system. Matching of the impedance may be achieved by using one or more matching reconfiguration elements with characteristic impedances that lie between the start and the end impedance. One particular disadvantage of such reconfigurable elements is their low maximum rating for power and current, which limits use of this matching to low-power stages. In other words, this matching process may not be optimized to the extent desired for reducing the current and/or DC-dissipation load of the matching reconfigurable components. Thus, for medium or high power applications, the traditional design approach, that results in, with a single dedicated hardware for a particular dedicated frequency band, is still valid.

For example, growth of wireless communication systems has increased the demand for highly efficient analog circuits, such as power amplifiers including radio frequency (RF) power amplifiers. A power amplifier is an active, two-port device that exhibits both linear and non-linear behavior. Some design parameters for RF power amplifiers include high output power, high linearity, and good efficiency.

Moreover, newer technologies demand transmission of large amounts of data with only a small portion of the spectrum being used. This may be accomplished using sophisticated modulation techniques, leading to wide, dynamic signals that benefit from linear amplification. For instance, some modern wireless applications, such as those based on the Wideband Code Division Multiple Access (WCDMA) standard, use non-constant envelope modulation techniques with a high peak-to-average ratio. In many modern mobile communication networks, however, the transmission gets more and more complex using higher power levels.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

The present invention is directed to overcoming, or at least reducing, the effects of, one or more of the problems set forth above.

In one embodiment of the present invention, a method is provided for impedance matching. The method comprises providing an analog circuit to substantially match a start impedance to an end impedance and tuning a performance parameter of an associated circuit using the analog circuit operating at a high-power level.

In a further embodiment of the present invention, a method is provided for tuning impedance of a network element in a wireless network. The method comprises transforming the impedance of the network element in a range above a start impedance and an end impedance. The method further comprises matching the impedance on a relatively higher level to increase a power and current handling capability of the network element for at least one of medium and higher power applications based on a characteristic impedance of the network element.

In another embodiment, an apparatus comprises an analog circuit for matching impedance using a matching network element and an associated circuit coupled to the matching network element. The matching network element to match a start impedance to an end impedance of the analog circuit by tuning the analog circuit for the associated circuit to operate at one of a first, second, or higher order frequency bands in response to transforming the start impedance to the end impedance using a characteristic impedance of the matching network element within a range above the start impedance and the end impedance.

In yet another embodiment, a communication circuit associated with a wireless network comprises a power amplifier having an output impedance and a circuit for a network element. The circuit may be coupled to the power amplifier to match the output impedance to a load. By tuning an impedance of the network element, the circuit to transform an impedance of the network element in a range above a start impedance and an end impedance for matching the impedance on a relatively higher level to increase a power and current handling capability of the network element for at least one of medium and higher power applications based on a characteristic impedance of the network element.

BRIEF DESCRIPTION OF THE DRAWINGS

The invention may be understood by reference to the following description taken in conjunction with the accompanying drawings, in which like reference numerals identify like elements, and in which.

Figure 1:
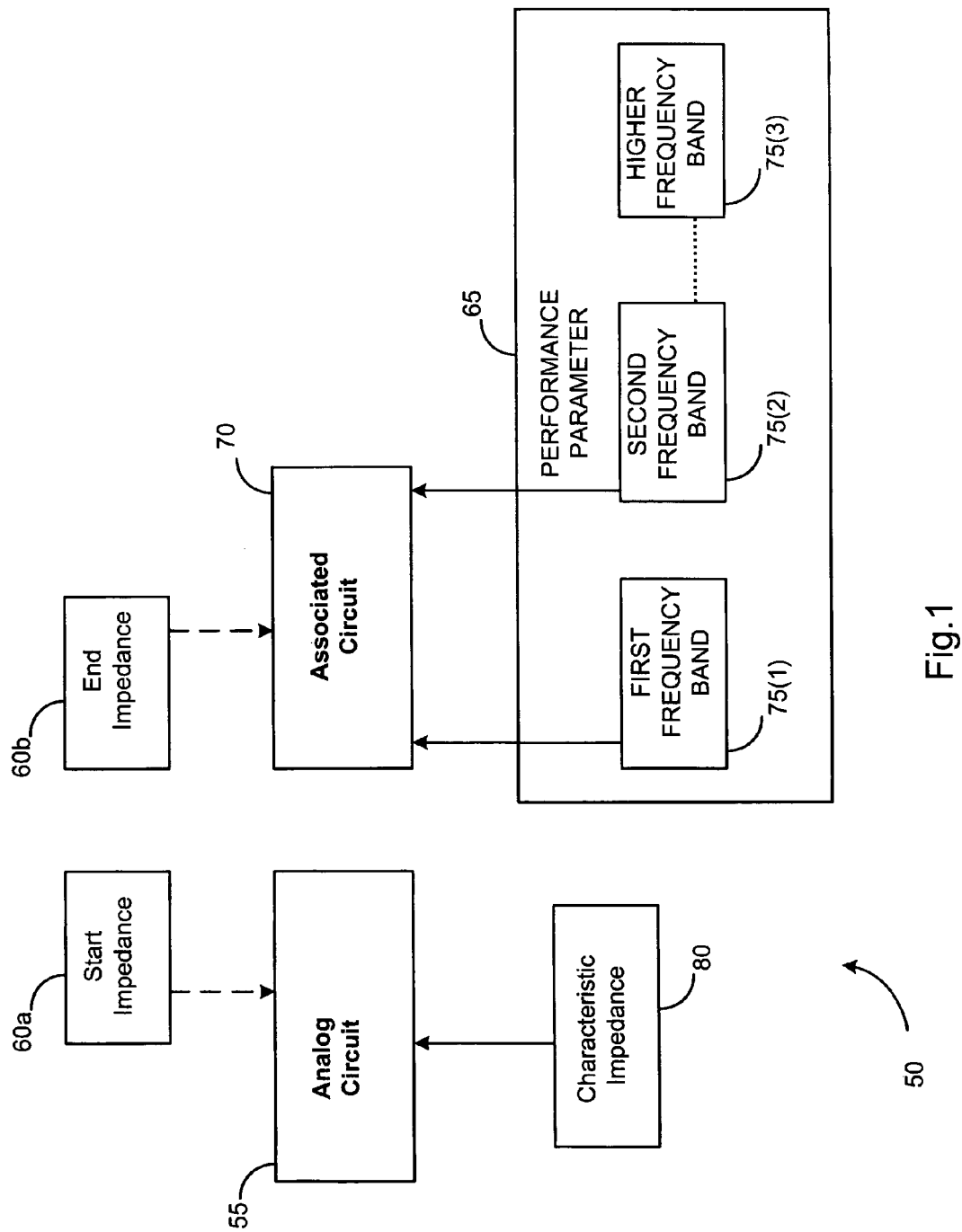
FIG. 1 illustrates an analog circuit coupled to a surrounding circuit associated with the analog circuit in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Generally, a method and apparatus are provided for impedance matching using an analog circuit. The method comprises providing the analog circuit to match a start impedance to an end impedance and tuning a performance parameter of an associated circuit using the analog circuit operating at a high power level. In one embodiment, the analog circuit may be used to describe the capability of reconfigurable matching structures for medium and/or high power applications. An amplifier supplier or vendor may use this method to increase the flexibility of the product by changing the matching transformation process in such way to obtain a high intermediate reconfiguration impedance so that the maximum current and/or DC-rating of the reconfiguration elements is not violated. By using this matching transformation process, reconfigurable matching circuits for medium and/or high power applications may be provided by using available lower power reconfiguration elements. In the matching transformation process, the intermediate impedance at which the reconfiguration is performed is higher than the matching processes used for lower power reconfiguration elements. A relatively smaller and cheaper reconfiguration element having lower parasitics may be used. For example, by applying the matching transformation process to a radio frequency (RF) power amplifier, first the analog circuit may transform, for example 10 Ohm output impedance to 100 Ohm, thereafter, perform the reconfiguration at that high impedance level and then transform this high impedance back to the standardized 50 Ohm (refer to FIG. 2).

Referring to FIG. 1, an apparatus 50 may provide reconfigurable high impedance for matching impedance in medium and/or high power applications in accordance with one embodiment of the present invention. To provide impedance matching, the apparatus 50 may use an analog circuit 55 for an amplifier or a network element operating at a high power level. The analog circuit 55 may match a start impedance 60a to an end impedance 60b thereof. One example of the start impedance may be 10 Ohm and the end impedance may be 50 Ohm. Examples for use of the analog circuit 55 include using the analog circuit 55 with a power amplifier, such as a radio frequency (RF) power amplifier deployed within a wireless network for providing telecommunications services.

The analog circuit 55 may tune a performance parameter 65 of a surrounding or an associated circuit 70, in accordance with one embodiment of the present invention. To obtain a higher level of intermediate impedance, the analog circuit 55 may reconfigure or tune impedance such that the analog circuit 55 may change the matching transformation process in a desired way. That is, the high intermediate impedance may be such that the maximum current rating and/or DC-dissipation rating of the analog circuit 55 are not violated. To this end, the analog circuit 55 may lower current therethrough using the higher level of impedance for reconfiguration thereof to tune the performance metric 65, e.g., operation across different frequency bands for the associated circuit 70.

For the purposes of matching the start impedance 60a to the end impedance 60b, in one embodiment, the analog circuit 55 may be coupled to the associated circuit 70. By providing the analog circuit 55, the apparatus 50 may tune the performance parameter 65 of the associated circuit 70. The analog circuit 55 may reconfigure high intermediate impedance of itself for impedance matching to the associated circuit 70 that may operate one of a first 75(1), a second 75(2) or higher order frequency band 75(3).

In operation, for example, the impedance matching of the analog circuit 55 may be reconfigured by transforming the start impedance 60a to the end impedance 60b using a characteristic impedance 80 in a range above the start impedance 60a and the end impedance 60b. In radio communications, characteristic impedance of a uniform transmission line is the impedance of a circuit that, when connected to the output terminals of a line of arbitrary length, causes the line to appear infinitely long. A value of impedance (resistance and reactance) of a transmission line measured over a frequency range that would exist if the line were infinite in length. A transmission line of finite length may provide ideal power transmission, allowing for absorptive transmission losses, if driven and terminated by an exact conjugate matching load impedance. An inexact match typically causes reflections that increase transmission loss. One example of the analog circuit 55 is a conventional impedance matching circuit 60b having the characteristic impedance 80.

By reconfiguring the analog circuit 55 for impedance matching, medium or higher power applications may be realized by using available low power configuration at low power configuration elements. Examples of low power configuration elements include reconfigurable matching circuits, continuous variable components like varactors, variometers and potentiometers and/or switching components like relays, switches and pin-diodes. In this way, the analog circuit 55 may provide a matching process at an intermediate impedance at which the configuration occurs.

Figure 2:
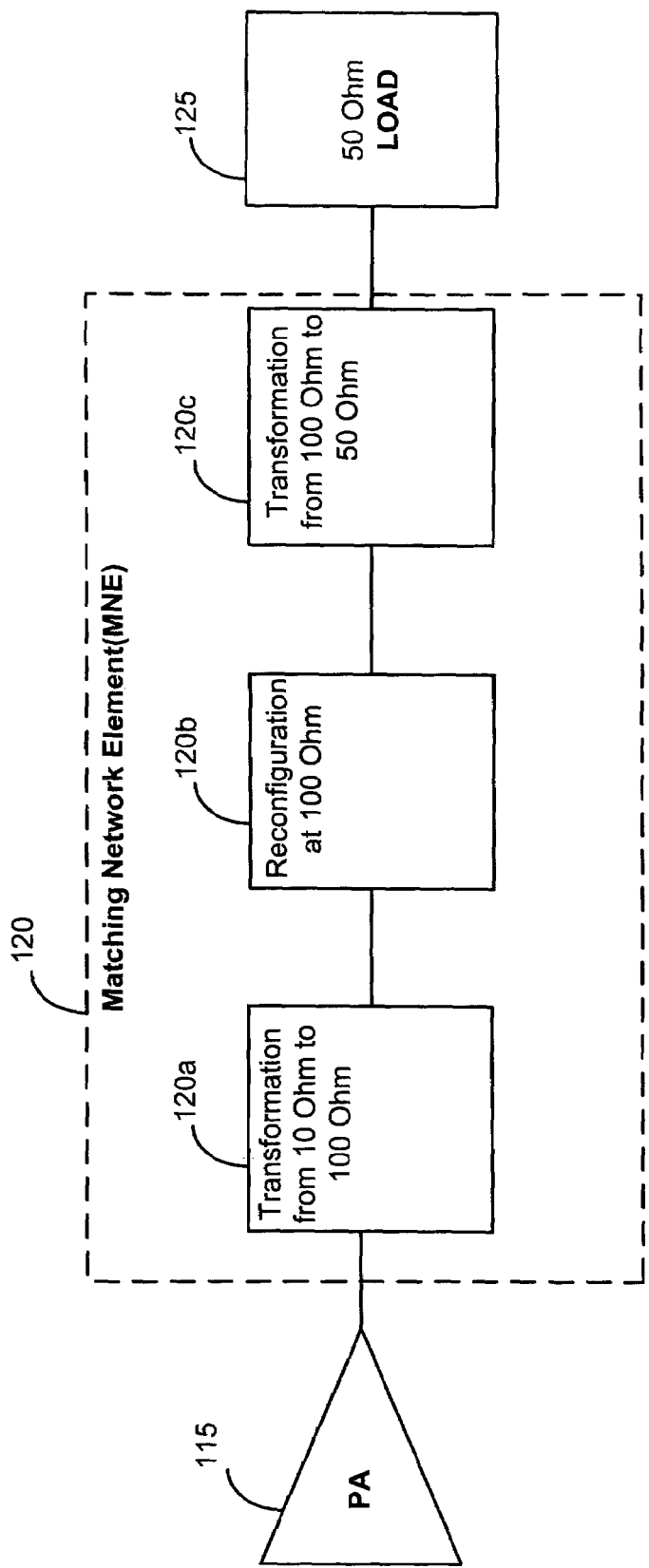
FIG. 2 illustrates a power amplifier coupled to a matching network element circuit consistent with one embodiment of the present invention.

Referring to FIG. 2, for high impedance matching a matching network element (MNE) 120 may be coupled to a power amplifier (PA) 115 in accordance with one embodiment of the present invention. The matching network element 120 may comprise a plurality of reconfiguration elements 120a, 120b, and 120c. The reconfiguration elements 120a-120c may transform the current and matching network element 120 based on an equation:

$$P = R \times I^2 \qquad (1)$$

where P is power, R is impedance and I is current. The reconfiguration elements 120a-120c may transform the start impedance 60a to match an intermediate impedance.

The matching network element 120 may couple the power amplifier 115 to a load 125. An example of the load 125 is a filter with an antenna. The matching network element 120 refers to one exemplarily embodiment of the analog circuit 55 shown in FIG. 1 in apparatus 50.

While the reconfiguration element 120b may represent the intermediate impedance, such as 100 Ohm, the reconfiguration element 120a may transform the start impedance 60a, such as 10 Ohm to the intermediate impedance, 100 Ohm. In this way, the matching network element 120 may match the start impedance 60a to the intermediate impedance that is higher than a threshold impedance to insure that at least one of a given maximum current and DC-dissipation rating of the matching network element 120 is not violated. The reconfiguration element 120c may transform the intermediate impedance, i.e., 100 Ohm at which reconfiguration is performed back to the end impedance, i.e., 50 Ohm of the analog circuit 55, which uses the matching network element 120 shown in FIG. 2.

Figure 3:
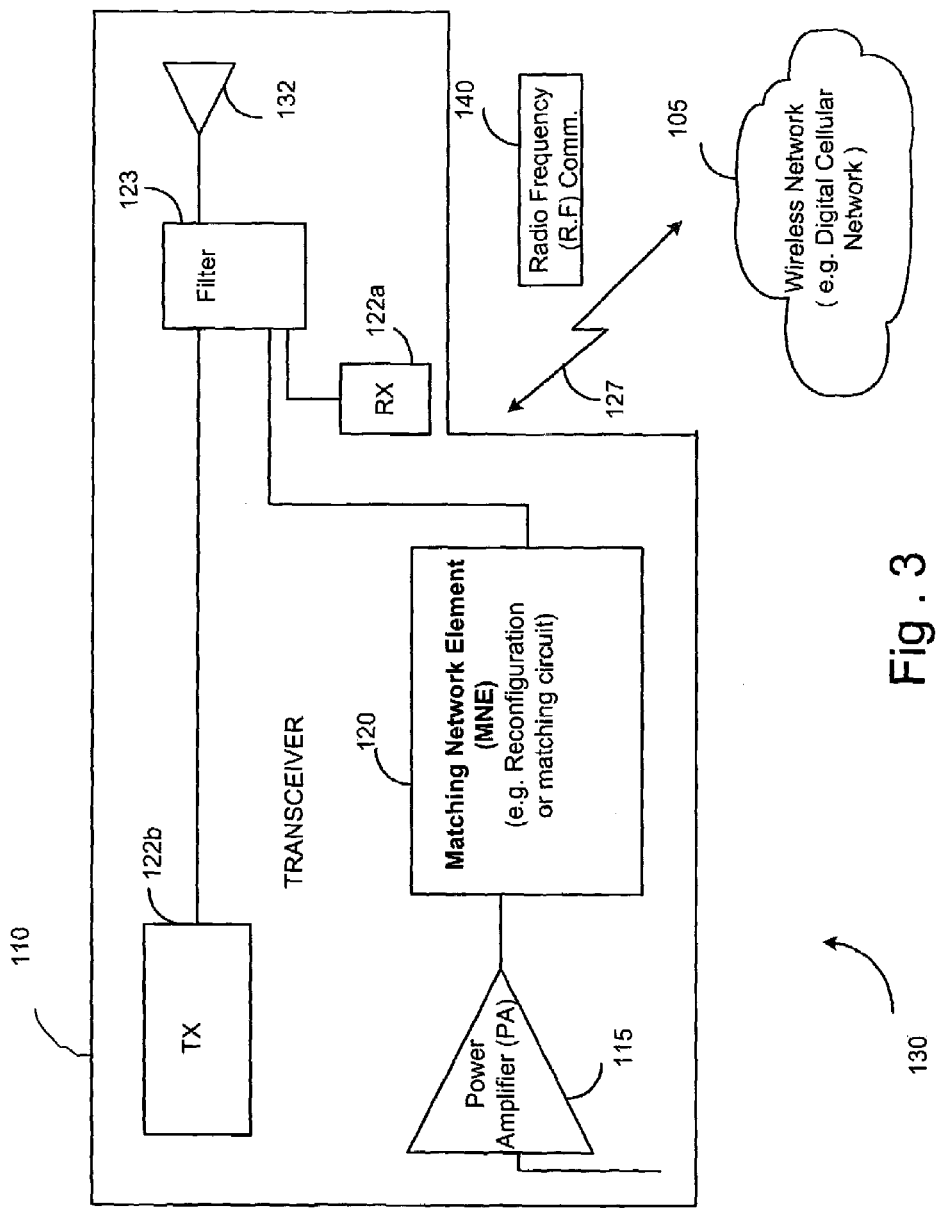
FIG. 3 illustrates a telecommunication system including a wireless network to communicate with a transceiver having a power amplifier coupled to a matching network element circuit according to one illustrative embodiment of the present invention.

Referring to FIG. 3, a telecommunication system 130 is shown for tuning impedance of a network element using the matching network element (MNE) 120 in a wireless network 105 according to one embodiment of the present invention. By transforming the impedance of the matching network element 120 in a range above the start impedance 60a and the end impedance 60b, the matching network element 120 may match the impedance on a relatively higher level to increase a power handling capability to increase a power and current handling capability of the matching network element 120. This increase may occur for at least one of medium and higher power applications based on the characteristic impedance 80 of the matching network element 120.

The telecommunication system 130 may be defined, at least in part, by a Third Generation (3G) mobile communication standard based on a Universal Mobile Telecommunications System (UMTS) protocol, in one embodiment. For example, the RF communication 140 may operate according to a Code Division Multiple Access (CDMA) standard or a Global System for Mobile Communications (GSM) standard, which is a land mobile pan-European digital cellular radio communications system. In this way, the transceiver 110 may send or receive, voice, data, or a host of voice and data services in different generations of the wireless network 105, including a digital cellular network based on one or more standards including UMTS and 3G-1X (CDMA) 2000), as well as IS-95 CDMA, GSM and Time Division Multiple Access (TDMA).

As shown in FIG. 3, the power amplifier 115 may couple to the matching network element 120, which in turn, may couple to a filter 123 and an antenna 132 within a communication circuit, such as a transceiver 110. The transceiver 110 may be a mobile communication device, such as a wireless portable device or a mobile station. The transceiver 110 may comprise a receiver 122a, a transmitter 122b coupled to the filter 123, which in turn, may couple to an antenna 132. The transceiver 110 may communicate over an air interface 127 using a wireless communication medium. Examples of the wireless communication medium include any one of standards suitable for implementing a particular application. For example, IEEE 802/11, GSM, WCDMA, CDMA 2000, UTMS. The transceiver 110 may communicate a radio frequency (RF) communication 140 over the wireless network 105. An example of the wireless include a digital cellular network.

According to one embodiment of the present invention, the load 125 may indicate a load that the power amplifier 115 may drive in the transceiver 110. The matching network element 120 may optimize a performance metric of the transceiver 110 by integrating the analog circuit 55 using the matching network element 120.

In operation, to match the impedance on a relatively higher level, the matching network element 120 may transform the power and current of the matching network element 120 during a matching process to serve a different frequency band than an instantaneous operating frequency band. The matching network element 120 may reduce at least one of a current and DC-dissipation load of the matching network element 120. By using the matching network element 120 with the power amplifier 115 capable of operating at a desired radio frequency (RF) range, the performance metric or parameter of a surrounding or the associated circuit 70, shown in FIG. 1, may be tuned.

The power amplifier 115 may amplify a signal stimulus, such as a modulated signal to provide a desired output power level for a RF communication 140 over the air interface 127 according to one illustrative embodiment of the present invention. In accordance with one embodiment, the power amplifier 115 may be a radio frequency (RF) amplifier defined, at least in part, based on a Code Division Multiple Access (CDMA) protocol standard in the wireless network 105, for example, a mobile communication or digital cellular network. Consistent with another embodiment, the power amplifier 115 may be an RF amplifier defined at least in part based on a Universal Mobile Telecommunication System (UMTS) protocol standard in the wireless network 105.

One purpose of the power amplifier 115 may be to deliver power to an antenna as efficiently as possible, preserving a maximum power transfer through amplification. For example, the power amplifier 115 may provide an amplification function for a mobile wireless device, such as a handset or a mobile station or a fixed wireless device, such as a base station in the telecommunication system 130, e.g., a digital wireless communication system. However, the signal level of the RF communication 140 may be amplified enough to overcome inherent losses during the air interface 127 so that it can be received by the mobile stations or the base station, or vice versa. The power amplifier 115 may deliver a high output power for the air interface 127, which can be as low as 1 W and as high as hundreds of Watts, as two examples.

In one embodiment, the most efficient operation of the power amplifier 115 is near compression, which is an advantage of standards like GSM that employ a constant envelope modulation technique like Gaussian Minimum Shift Keying (GMSK). Such modulation techniques ensure that the envelope of a transmitted signal, i.e., the RF communication 140, is constant. This enables the power amplifier 115 of the telecommunication system 130 to operate near saturation without distortion. On the other hand, other standards with more efficient data rates use modulation techniques like Binary Phase Shift Keying (BPSK), Quadrature Phase Shift Keying (QPSK), and Quadrature Amplitude Modulation (QAM).

The performance of the transceiver 110 in mobile communications depends significantly on the performance of the power amplifier 115. A high linearity is one characteristic of a well-designed power amplifier, for example, a power amplifier for a wideband WCDMA (2.11-2.17 GHz) band without compromising on a predefined linearity requirement. For example, different measurements may be obtained using a signal that is swept over frequency or power for digitally modulated signals of high channel power. A power meter may accurately measure the output power of the RF communication 140.

In wireless mobile communications systems, such as the telecommunication system 130 a high power amplification of signals for transmission generally encounters a relatively large ratio of peak to average power (PAR). For example, in a time division multiple access (TDMA) system when multiple carrier signals are combined for amplification with the power amplifier 115, the resulting PAR is about 9-10 dB for a large number of carriers. In a code division multiple access (CDMA) system a single loaded 1.25 Mz wide carrier may have a PAR of 11.3 dB.

Figure 4:
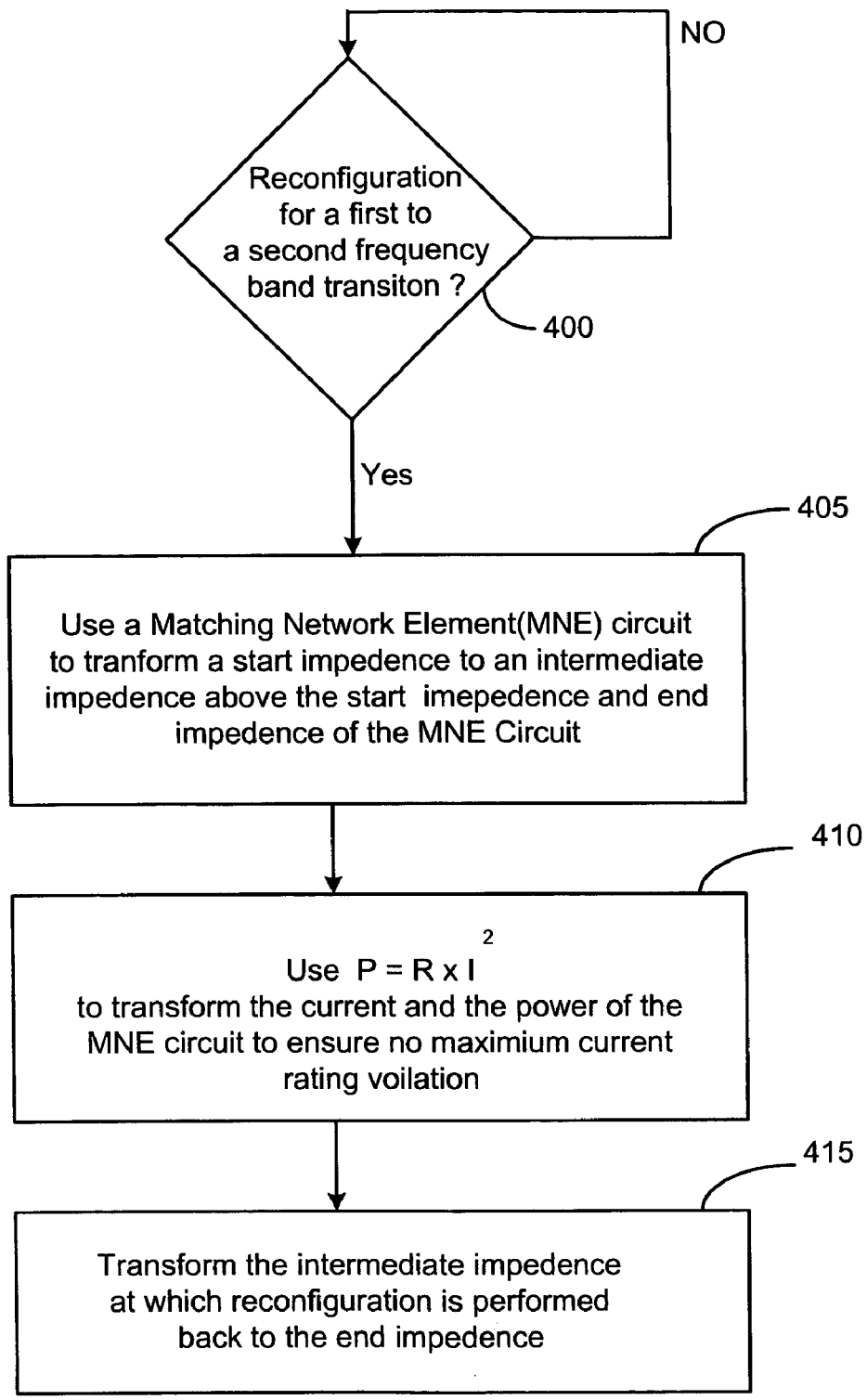
FIG. 4 illustrates a stylized representation for implementing a method of reconfiguring impedance matching for high power circuits, such as for the power amplifier shown in FIG. 2 consistent with an exemplary embodiment of the present invention.

Referring to FIG. 4, a method of reconfiguring impedance matching using the analog circuit 55 operating at a higher power level is schematically shown in accordance with one embodiment of the present invention. A decision block 400 may determine whether reconfiguration is desired for a transition from the first to second or higher order frequency bands 75(1, 2). If yes, at block 405, the matching network element (MNE) 120 may be used. That is, the analog circuit 55 shown in FIG. 1 may use the matching network element 120 to transform the start impedance 60a to an intermediate impedance above the start impedance 60a and the end impedance 60b of the matching network element circuit 120.

At block 410, equation (1) for calculating the power P based on the impedance and current that may be used to transform the current and the power of the matching network element circuit 120. The equation (1) may ensure that maximum current and/or DC-dissipation rating violation does not occur. At block 415, the matching network element 120 may transform the intermediate impedance at which reconfiguration is performed back to the end impedance 60b.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention set forth above is described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

While the invention has been illustrated herein as being useful in a telecommunications network environment, it also has application in other connected environments. For example, two or more of the devices described above may be coupled together via device-to-device connections, such as by hard cabling, radio frequency signals (e.g., 802.11(a), 802.11(b), 802.11(g), Bluetooth, or the like), infrared coupling, telephone lines and modems, or the like. The present invention may have application in any environment where two or more users are interconnected and capable of communicating with one another.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method of impedance matching in a circuit including a power amplifier having a first impedance, the power amplifier being configured to provide a signal to a transceiver circuit having a second impedance that is higher than the first impedance, the transceiver circuit being capable of operating in a plurality of frequency bands, the method comprising:
   providing an analog circuit to substantially match the first impedance to the second impedance, the analog circuit comprising:
   a reconfigurable circuit that operates in a plurality of modes corresponding to the plurality of frequency bands used by the transceiver circuit, the reconfigurable circuit having a third impedance higher than the first impedance and the second impedance;
   a first impedance matching circuit coupled between the power amplifier and the reconfigurable circuit for matching the first impedance to the third impedance; and
   a second impedance matching circuit coupled between the reconfigurable circuit and the transceiver circuit for matching the third impedance to the second impedance.

2. A method, as set forth in claim 1, comprising selecting one of the plurality of modes of the reconfigurable circuit in response to changing the frequency band used by the transceiver circuit.

3. A method, as set forth in claim 2, comprising selecting the third impedance based on an equation $P=R \times I^2$, where P is power, R is impedance and I is current.

4. A method, as set forth in claim 3, wherein selecting the third impedance comprises selecting the third impedance to be higher than a threshold impedance to ensure that at least one of a given maximum current and DC-dissipation rating of said matching network element is not violated.

5. A method, as set forth in claim 3, wherein selecting the third impedance comprises selecting the third impedance to increase a power and current handling capability of the reconfigurable circuit for at least one of medium and higher power applications based on a characteristic impedance of said reconfigurable circuit.

6. A method, as set forth in claim 5, comprising
   transforming the power and current of the reconfigurable circuit during a matching process to serve a different frequency band than an instantaneous operating frequency band.

* * * * *